Jesse Urmy.
Harvester Cutter.
No. 883. Reissued. Jan 3. 1860.
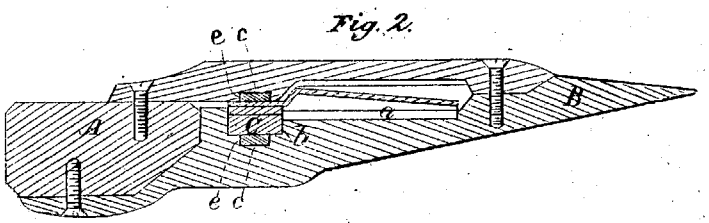
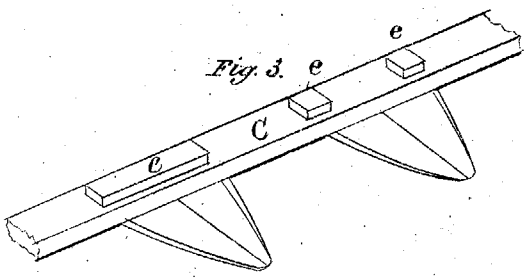
Witnesses.
E. Cohen
E. N. Smith
A. B. Stoughton,
Atty for Jesse Urmy.
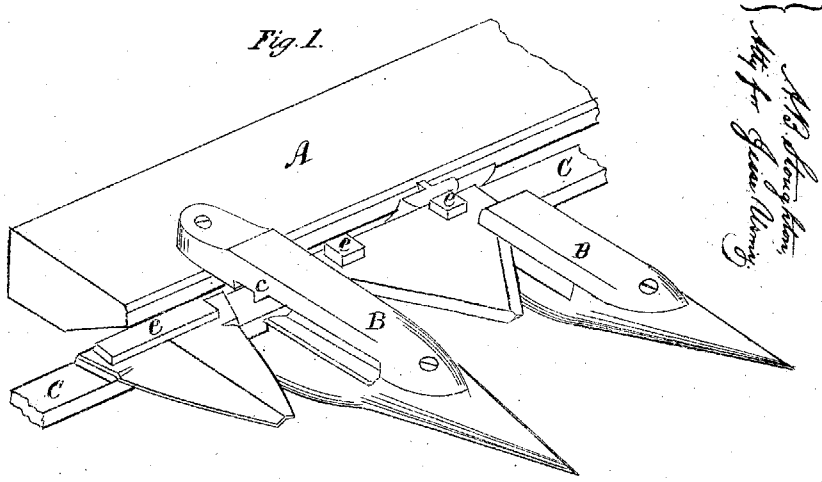

UNITED STATES PATENT OFFICE.

JESSE URMY, OF WILMINGTON, DELAWARE, ASSIGNOR TO DAVID M. OSBORNE, OF AUBURN, NEW YORK.

IMPROVEMENT IN GRAIN AND GRASS HARVESTERS.

Specification forming part of Letters Patent No. 13,330, dated July 24, 1855; Reissue No. 883, dated January 3, 1860.

DIVISION B.

*To all whom it may concern:*

Be it known that I, JESSE URMY, of Wilmington, in the county of New Castle and State of Delaware, have invented certain new and useful Improvements in Grain and Grass Harvesters; and I do hereby declare the following to be a full, clear, and exact description of the same, reference being had to the accompanying drawings, making a part of this specification, in which—

Figure 1 represents in perspective a section of a finger-beam and cutter-bar with their several parts, constituting what is termed the "cutting apparatus" of a grain or grass harvester. Fig. 2 represents a vertical longitudinal section taken through one of the fingers or guards, and the cutter, cutter-bar, and projections on the latter as they are arranged, supported, and connected together. Fig. 3 represents in perspective a portion of a cutter-bar with the blades or cutters and the projections upon it for the purpose of clearing out the grass and dirt which may lodge in the guards and clog the cutter.

Similar letters of reference, where they occur in the several figures, denote like parts of the apparatus in all of them.

So difficult has it been to prevent grass and other matter from working into the guards, and thus clog or choke the free action of the cutters, that said guards have been cut off at the top or bottom, or left open to allow the grass, &c., to work out; but while this prevents the choking or clogging, it requires the guard to be held to the finger-beam by its under or upper portion only, and not by both. A closed guard therefore has this advantage, that it can be made lighter and stronger and be better secured to the finger-bar than an "open guard," as it is termed, because it has a brace or support at both its upper and under part, while the open guard has but one support. There are advantages and disadvantages, therefore, in the closed guard. I avail myself of its advantages—viz., its strength, lightness, and firmer attachment to the finger-beam—and devise a means for overcoming its objectionable tendency to clog or choke the cutting apparatus, and thus effect a very desirable object.

My invention consists in combining with a closed guard having suitable openings through it a cutter-bar with projections on both its upper and under side, so that as the cutter-bar is vibrated through said guards the projections shall clear out all grass or other matter that may lodge there, and which would otherwise choke the cutting apparatus or cause it to work with great difficulty, if it could work at all.

To enable others skilled in the art to make and use my invention, I will proceed to describe the same with reference to the drawings.

A represents a finger-beam to which the guards or fingers B are connected, said guards being of the form and construction known as "closed guards"—that is, guards which have their upper and under portions united together or to the finger-beam behind the cutter-bar. These guards have a suitable opening, *a*, through which the cutters or blades vibrate, and also a suitable opening, *b*, through and in which the cutter-bar C works and is supported; and they are, moreover, furnished with recesses *c c*, through which the projections *e e* vibrate, said projections *e e* being on the cutters above and below and in line with the cutter-bar. That these projections on the cutter may effect the purpose for which they are designed—viz., for clearing out the grass and dirt which may lodge in the guards—they must vibrate through the guards, for if they only vibrated in the guards they would not push or carry the grass or other clogging matter out of it. It is necessary that these projections go clear through the guard in their vibration to effect the removal of the grass, &c., therefrom; but any device that does not go clear through the guards in its vibrations does not come within the scope of my invention, and I lay no claim to such, for their action is no more than would be that of a continuous bar in the way of clearing the guards, while they would actually carry in the grass instead of carrying it out of the guard. My invention is limited, therefore, to projections on both the top and the bottom of the cutter-bar which go clear through the guard as the cutter-bar is vibrated back and forth through the closed guard.

I am aware that a single projection with an open guard has been patented, and that the closed guard has been used with a single projection upon the under side of the cutter-blade. These I do not claim; but

What I claim under this patent is—

In combination with a closed guard, the projections on the top and bottom of the cutter-bar for the purpose of clearing out the grass and other matter which tends to lodge in said guard, substantially as described.

JESSE URMY.

Witnesses:

A. B. STOUGHTON,

E. COHEN.